June 16, 1959   R. O. MITCHELL   2,890,543
TRAWL NET ATTACHMENT
Filed Feb. 28, 1957   2 Sheets-Sheet 1

INVENTOR
ROBERT O. MITCHELL (deceased)
Administrator:
GERALD G. MITCHELL
BY *Toulmin & Toulmin*
ATTORNEYS

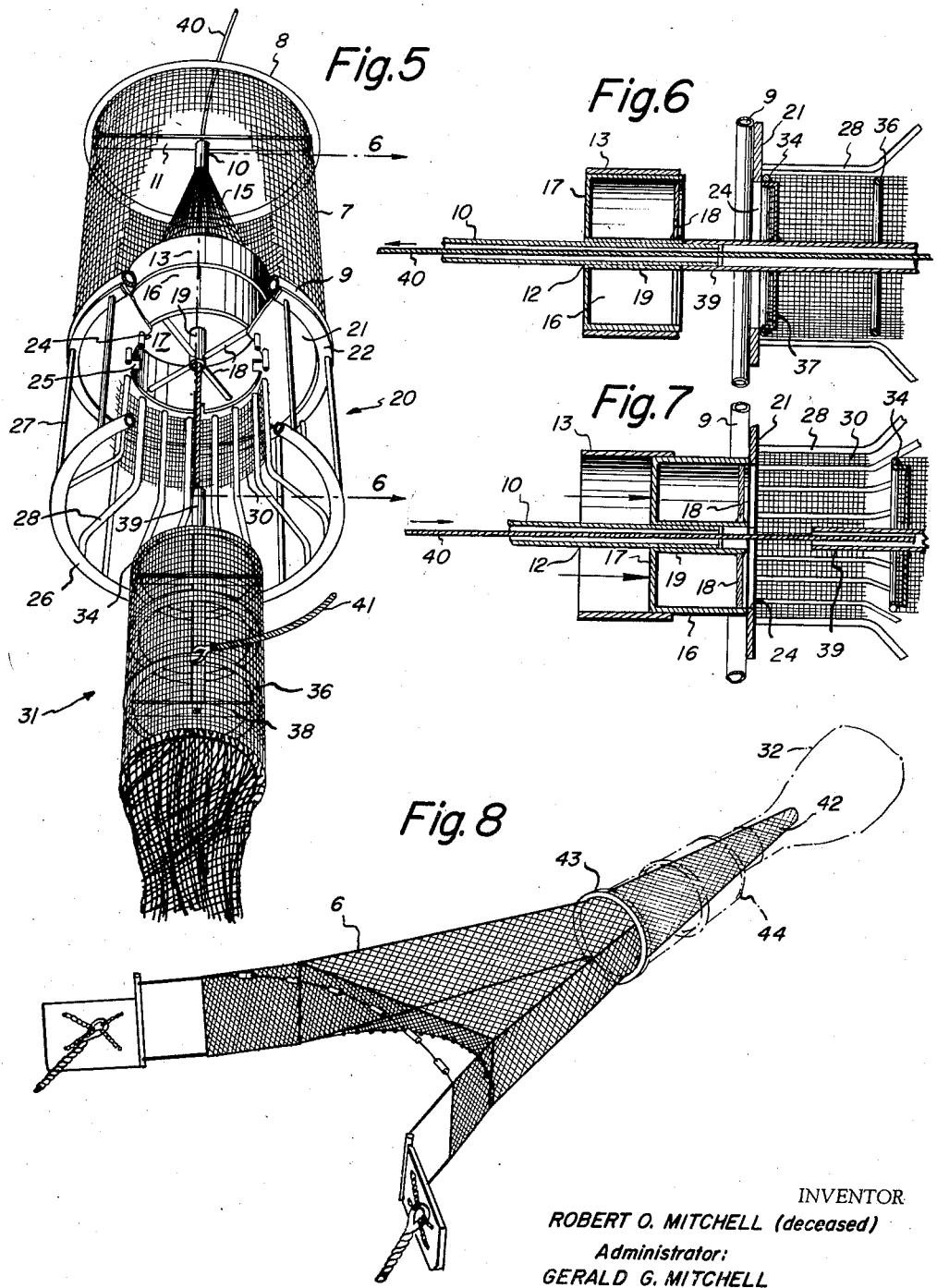

United States Patent Office 2,890,543
Patented June 16, 1959

2,890,543

TRAWL NET ATTACHMENT

Robert O. Mitchell, deceased, late of Long Beach, Miss., by Gerald G. Mitchell, administrator, Long Beach, Miss., assignor of one-third to Mildred Mitchell and one-third to Donald Mitchell, both of Long Beach, Miss.

Application February 28, 1957, Serial No. 643,067

12 Claims. (Cl. 43—9)

The present invention relates to a device for periodic emptying of a trawl net without interrupting the gathering operation, more particularly, to a device which is attached to a trawl net to facilitate the detaching and subsequent positioning of a pick-up from the trawl net after being emptied.

In the ordinary shrimp gathering operation the trawl must be picked up every time the catch is brought aboard the boat. To accomplish this the boat is stopped and the net is hauled in until the trawl boards are on the boat. The boat is then put into a tight circle so as to prevent the trawl from catching or fouling the rudder or propeller and the bag is hoisted aboard by a tackle arrangement. On the average sized shrimper this operation may consume from an hour to an hour and one-half.

The present invention enables the catch to be brought aboard the shrimper without picking up the trawl. While a pick-up containing the catch is being brought aboard and repositioned with respect to the trawl net after being emptied, the trawl net itself is catching shrimp. Thus, the present invention permits a continuous fishing operation since fishing may be conducted without interruption even while the catch of the trawl net is being emptied.

It is therefore the principal object of this invention to provide a novel and simplified device for positioning a detachable pick-up on a trawl net.

It is another object of this invention to provide an inexpensive pick-up and guiding device therefor which may be readily attached to any type of net.

It is a further object of this invention to provide an apparatus for gathering shrimp and the like which may be periodically emptied without interrupting the fishing operation.

It is an additional object of this invention to provide an improved method for the continuous gathering of shrimp and the like.

It is still another object of this invention to provide a trawl net which will enable fishermen to operate in rough weather because it is unnecessary to pick up the trawl net.

It is still a further object of this invention to eliminate the expensive winches and hoisting equipment ordinarily necessary upon a shrimper in order to lift the average trawl net aboard the boat and to permit the substitution of considerably smaller winches and tackles necessary only to raise the pick-up device itself.

Other objects and advantages of this invention will become apparent upon reference to the accompanying description taken in conjunction with the following drawings wherein:

Figure 5 is an over-all perspective view looking from the rear of the device with the guide and pick-up attached and a portion of the device removed to show valve details;

Figure 6 is a partial sectional view of the device along the lines 6—6 as shown in Figure 5 but in enlarged scale and with the conical baffle 15 removed and showing the valve in the open position;

Figure 7 is a partial sectional view of the device similar to that of Figure 6 and showing the valve in the closed position; and Figure 8 is a perspective view of an ordinary trawl net showing the manner in which this net may be adapted to be equipped with the device of this invention.

Figure 1:
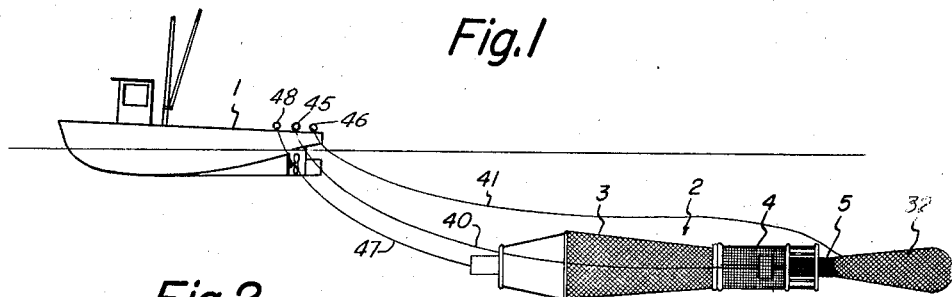
Figure 1 is a schematic view showing the trawl net device of this invention being drawn by a shrimper during the fishing operation.

Returning now to the drawings, more particularly to Figure 1, wherein like reference symbols indicate the same parts throughout the various views, 1 indicates a fishing boat of the type commonly used in the shrimp gathering operation and called a shrimper. The shrimper 1 is towing a shrimp gathering device 2 which comprises a net 3 which directs the fish into the shrimp gathering device 2, and the device 4 of this invention which includes a pick-up 5.

The net 3 may be of any type such as the conventional trawl net 6 illustrated in Figure 8.

Figure 2:
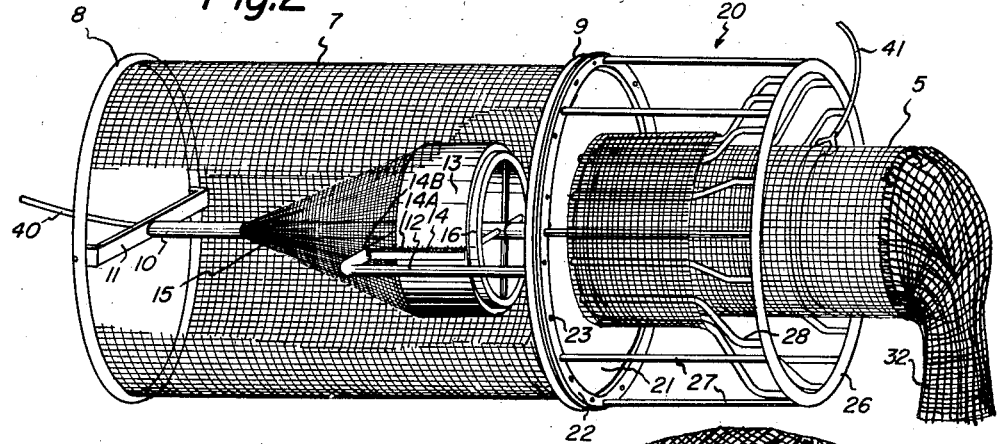
Figure 2 is an over-all perspective view of one embodiment of this invention with a portion of the mesh removed.
Figure 3:
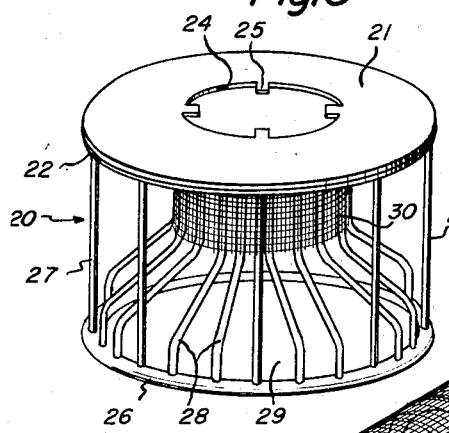
Figure 3 is an over-all perspective view of the guide device per se.
Figure 4:
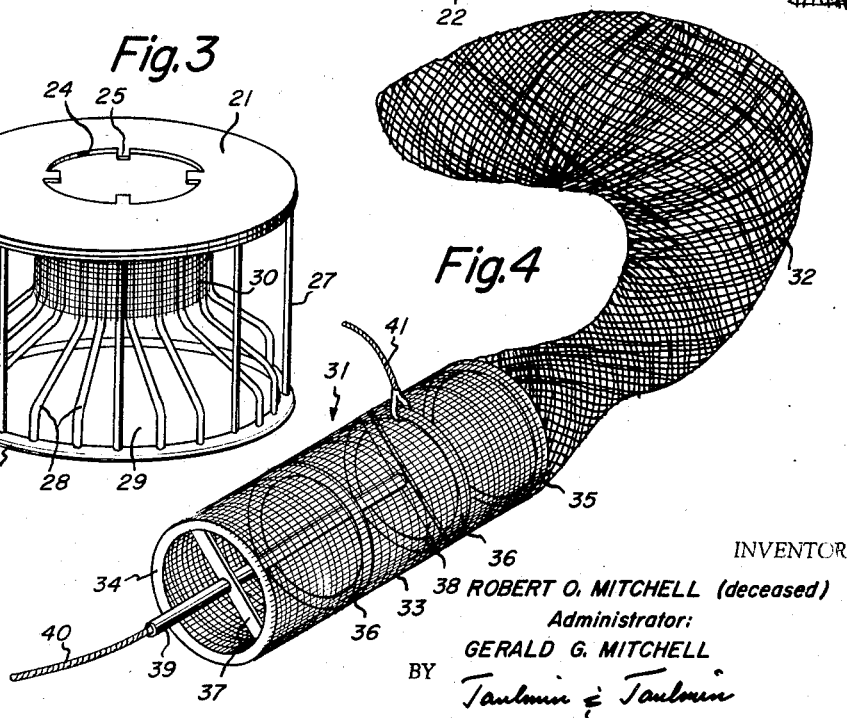
Figure 4 is an over-all perspective view of the pick-up with the gathering net attached thereto.

The device of this invention is illustrated in Figure 2 and comprises a cylindrical collecting portion 7 formed of a metallic mesh supported upon a frame comprising a front ring 8 and a rear ring 9, each formed of aluminum rods. A hollow rod 10 is mounted along the central axis of the device 4 upon a front support 11 which is secured to the front ring 8 and a U-shaped rear support bracket 12, the ends of which are attached to the rear ring 9. As may be best seen in Figures 6 and 7, the rear end of the hollow rod 10 terminates short of the rear ring 9.

A cylindrical baffle 13 made of sheet metal has arms 14 secured to the outer face thereof such as by welds 14A, and the arms 14 are attached as at 14B to the forward portion or closed end of the rear bracket 12. A conical baffle 15 made of a metallic wire mesh is attached to the cylindrical baffle 13 and extends forwardly thereof along the hollow rod 10.

A cylindrical valve 16 is telescopingly mounted within the cylindrical baffle 13. The cylindrical valve 16 has its front end closed as indicated at 17, see Figures 5–7, to present a surface which is acted upon by the water, when the net is towed through the water, to act as a closure operator for the valve in a manner to be presently described. The valve 16 is attached by a plurality of radially extending internal braces or supports 18 to a centrally supported hollow rod 19 which slides upon the hollow rod 10. The diameter of the cylindrical valve 16 is somewhat less than the diameter of the cylindrical baffle 13 to enable the valve to telescope within the baffle.

Secured to the rear end of the collector 7 is a guide device 20 which comprises a front plate 21 and a ring 22 both of which are secured to the collector rear ring 9 by bolts 23. The diameter of the ring 22 is substantially equal to the diameter of the plate 21. The plate 21 has a centrally located opening 24 therein with a plurality of spaced stops 25 positioned around the perimeter of the opening.

A rear or entrance ring 26, which has a diameter greater than the opening 24, is interconnected by a plurality of circumferentially spaced aluminum tubular rods 27 to the guide ring 22. The diameter of the rear ring 26 is shown as being substantially equal to the diameter of the collector but this relationship is not necessary.

A second set of hollow aluminum guide rods 28 interconnect the rear ring 26 with the front plate opening 24. Each of the guide rods 28 is circumferentially spaced and has the shape of a flattened S-bend. The circumferentially spaced guide rods 28 form a passage 29 which converges from the rear ring 26 into the direction of the front plate opening 24. Wire mesh 30 surrounds the small diameter end of the converging passage 29 adjacent the front plate 21 and the collector 7.

The pick-up 5 comprises a rigid portion 31 and a net or retaining portion 32. The rigid portion comprises a cylinder 33 formed of a metallic mesh which is supported upon a frame comprising a front ring 34, rear ring 35 and intermediate rings 36.

There is a diametrically extending cross-bracket 37 extending across the front ring 34 and a similar cross-bracket 38 extending across one of the intermediate rings 36. A hollow rod 39 which serves as the cylindrical valve actuator is supported on the brackets 37 and 38 and projects outwardly of the front end of the rigid portion of the pick-up. The rod 39 engages the supporting tubular valve in a manner to be presently described.

Both ends of the rigid portion 31 are open but the flexible net 32 is attached to the rear end of the rigid portion. The net retains the shrimp and the like which is gathered by the trawl net.

A guide line 40 extends from the rigid pick-up and passes through the rod 10 of the device. A second line designated as a pick-up line and indicated at 41 is attached to the top of the rigid portion 31 of the pick-up 5. Both of the lines 40 and 41 extend to small winches 45 and 46, respectively located on the deck of the fishing boat 1. A towing line 47 connects the shrimp gathering apparatus 2 with a winch 48 on the deck of the boat.

With the above embodiment of the shrimp gathering device in mind, the operation of this invention will next be described.

Returning now to Figure 1, the position of a trawl net and shrimp gathering device in actual operation is shown. The gathering device is being towed along behind the shrimper at the speeds commonly used in trawling. The shrimp are gathered by entering the front of the net and then guided outwardly by the conical baffle toward the cylindrical surface of the collector. The water passing through the opening 24 draws the shrimp through the opening formed when the cylindrical valve is withdrawn into the cylindrical baffle. The shrimp then pass into the front end of the rigid portion of the pick-up where they are subsequently gathered into the net.

When the net is full, the guide line 40 is loosened and simultaneously therewith the pick-up line 41 is drawn in by the action of the winch on the boat. This action causes the pick-up to be withdrawn from its engagement with the opening 24 in the front plate of the guide device 20. As the pick-up is withdrawn, the cylindrical valve follows the rearward action of the actuator rod and becomes closed as shown in Figure 7. The continued reeling in of the pick-up line 41 will soon bring the pick-up to the deck of the boat where the shrimp are emptied therefrom. At the same time the guide line is being passed through the hollow rod 10 in the device.

After the pick-up has been emptied, it is pushed overboard into the water and the guide line 40 is reeled in. Since the guide line 40 is passing through the rod 10 of the net, continuous reeling in of the guide line accompanied by loosening unwinding of the pick-up line 41 will eventually bring the pick-up to the rear end of the trawl net. As the pick-up enters the rear ring of the guide device, the guide rods will direct the movement of the pick-up under the action of the guide line until the pick-up movement is arrested by the stops 25 at which point the pick-up is engaged with the opening in the front plate. The forward movement of the pick-up with respect to the guide device causes the actuator rod 39 to engage the cylindrical supporting rod 19 and push the rod 19 upon the hollow rod 10. This action will open the cylinder 16 concurrently with the movement of the pick-up into engagement with the opening 24.

Upon the opening of the cylindrical valve 16 all the shrimp which have been gathered in the collector 3 during the emptying of the pick-up portion now pass through the opening formed by the forward movement of the cylindrical valve to pass into the pick-up. The gathering operation is then continued until the pick-up is again filled to its capacity.

A conventional trawl net such as shown in Figure 8 may be readily fitted with the device of this invention. The trawl net of Figure 8 is readily adapted to be fitted with the guide device of this invention by removing the rearward portion 42 and attaching an iron ring 43 to the end of the trawl net. The device 4 as illustrated in Figure 2 is then attached to this iron ring as shown in phantom lines at 44. The structure as described above or any other constructions utilizing the principles of this invention may be employed.

Thus it can be seen that present invention provides a simple and inexpensive device which may be readily attached to any type of net in order to enable the net to be used in continuous fishing even when the catch is being emptied. This device will decrease the amount of time consumed in the fishing operation since the pick-up is readily guided to the net after it has been emptied. Furthermore, the net continues to gather shrimp and the like during the emptying of the pick-up device. The combined result of this invention is to greatly facilitate the gathering of shrimp and the like in all kinds of weather and without the necessity of expensive and heavy hoisting equipment upon the fishing boats.

It will be understood that this invention is susceptible to modification in order to adapt it to different usages and conditions and, accordingly, it is desired to comprehend such modifications within this invention as may fall within the scope of the appended claims.

What is claimed is:

1. A device for guiding a pick-up into position with a trawl net, and comprising a first ring, a second ring spaced from said first ring and having a diameter substantially equal thereto, a plurality of rods interconnecting said rings, and a plurality of guide rods each having the shape of a flattened S-bend extending between said second ring and within said first ring to form a converging passage therebetween to guide the pick-up into position at said first ring.

2. A device for guiding a pick-up into engagement with a trawl net as claimed in claim 1 including a wire mesh surrounding said converging passage at the first ring opening end thereof.

3. In an apparatus for gathering shrimp and the like which may be emptied without interrupting the gathering operation, the combination of a collector, a detachable pick-up device attachable to said collector, and guide means associated with said collector for positioning the pick-up device on the collector during the shrimp gathering operation.

4. In an apparatus for gathering shrimp and the like which may be emptied without interrupting the gathering operation, the combination of a collector, a detachable pick-up device attachable to said collector, a guide device for positioning the pick-up on the collector during the shrimp gathering operation, and a valve in said collector opened by the positioning of the pick-up on the collector to permit communication between the collector and the pick-up so that shrimp gathered in the collector while the pick-up is detached therefrom will pass to the pick-up.

5. In an apparatus for gathering shrimp and the like which may be emptied without interrupting the gathering operation, a collector, said collector having an opening in the rear end thereof, a guide on the rear end of said collector surrounding said opening and forming a converging passage to said opening, and a pick-up within said passage communicating with said opening to store shrimp gathered by the collector, said pick-up being detachable from said collector.

6. In an apparatus for gathering shrimp and the like which may be emptied without interrupting the gathering operation, the combination of a collector having an opening in the rear end thereof, a valve in said collector operable to open and close said collector opening, a guide on the rear of said collector surrounding said opening and forming a converging passage to said opening, a pick-up within said passage and communicating with said opening to store shrimp gathered by the collector, said pick-up being detachable from said collector, and an actuator on said pick-up for opening said valve within said collector when said pick-up is positioned within said passage and in registration with said collector opening to enable shrimp in the collector to pass into the pick-up.

7. In an apparatus for gathering shrimp and the like which may be emptied without interrupting the gathering operation, the combination of a collector having an opening in the rear end thereof, a valve in said collector operable to open and close said opening, a guide at the rear of said trawl net to form a converging passage to said opening, a pick-up within said passage communicating with said opening, an actuator on said pick-up for opening said valve when said pick-up is within said passage and in registration with said opening, and means on said valve acted upon by the water surrounding said apparatus to close said valve when said pick-up is withdrawn from registration with said collector opening so that said collector will retain shrimp therein while said pick-up is detached therefrom.

8. In an apparatus for gathering shrimp and the like which may be emptied without interrupting the gathering operation, the combination of a collector having a rear opening therein, a hollow rod within said collector located centrally of said opening, guide means in the rear of said collector to form a converging passage to said opening, a pick-up positionable within said converging passage in registration with said collector opening to retain shrimp passed from said collector, and a line on said pick-up passing through said collector hollow rod for pulling said pick-up into registration with said opening.

9. In an apparatus for gathering shrimp and the like which may be emptied without interrupting the gathering operation, the combination of a collector having an opening in the rear thereof, a hollow rod within said collector located centrally of said opening, guide means in the rear of said collector forming a converging passage to said opening, a pick-up positionable within said passage in registration with said opening, a first line on said pick-up passing through said hollow rod for placing said pick-up in registration with said opening, and a second line on said pick-up for withdrawing said pick-up from its position on said collector to be emptied of its catch while said collector continues to gather shrimp.

10. In an apparatus for gathering shrimp and the like which may be emptied without interrupting the gathering operation, the combination of a collector having an opening in the rear end thereof, a hollow rod within said collector located centrally of said opening, guide means in the rear of said collector to form a converging passage to said trawl net opening, a pick-up within said passage and registerable with said collector opening to retain shrimp from said collector, and a valve slidably mounted on said collector hollow rod and operable to open and close said rear opening under the action of said pick-up so that said opening is open when said pick-up is positioned on the collector opening and closed when said pick-up is removed therefrom.

11. In an apparatus for the gathering of shrimp and the like which may be emptied without interrupting the gathering operation, the combination of a collector formed from metallic mesh, there being an opening in the rear of said collector, a hollow rod within said collector and located centrally of said opening, a cylindrical member forming a valve and slidably mounted on said hollow rod, the forward face of said valve presenting a surface which is acted upon by the water, a conical baffle extending forwardly of said valve, a ring spaced rearwardly of the rear of said collector, means forming a converging passage from said ring to said collector opening, a pick-up positionable within said passage in registration with said collector opening to retain shrimp gathered by the collector, an actuator on said pick-up for opening said valve when said pick-up is positioned against said collector opening, a first line extending from said pick-up and passing through said hollow rod for bringing said pick-up against said collector opening, and a second line extending from said pick-up for withdrawing said pick-up from its position on said collector so that the pick-up may be emptied of its catch while the collector continues to gather shrimp.

12. In the method of continuously gathering shrimp and the like, the steps of positioning a pick-up in communication with a trawl net, detaching the pick-up from the trawl net to empty the same, closing the communication between the trawl net and the pick-up simultaneously with the detaching of said pick-up, positioning said pick-up against said trawl net after said pick-up has been emptied, and establishing communication between said trawl net and pick-up to enable the sea life caught by the trawl net during the emptying of said pick-up to be transferred into said pick-up.

References Cited in the file of this patent

UNITED STATES PATENTS

| 13,539 | Butterfield | Sept. 11, 1855 |
|---|---|---|
| 2,626,477 | Richardson | Jan. 27, 1953 |
| 2,721,411 | Pedersen | Oct. 25, 1955 |